(12) United States Patent
Hibino et al.

(10) Patent No.: US 11,984,605 B2
(45) Date of Patent: May 14, 2024

(54) LITHIUM SECONDARY BATTERY

(71) Applicant: NGK INSULATORS, LTD., Nagoya (JP)

(72) Inventors: Masahiko Hibino, Nagoya (JP); Takayuki Kondo, Nagoya (JP); Tetsushige Yoshida, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 898 days.

(21) Appl. No.: 17/019,878

(22) Filed: Sep. 14, 2020

(65) Prior Publication Data

US 2021/0005896 A1 Jan. 7, 2021

Related U.S. Application Data

(63) Continuation of application No. PCT/JP2019/007649, filed on Feb. 27, 2019.

(30) Foreign Application Priority Data

Mar. 27, 2018 (JP) ................... 2018-060047

(51) Int. Cl.
   *H01M 50/136* (2021.01)
   *H01M 4/66* (2006.01)
   (Continued)

(52) U.S. Cl.
   CPC ........... *H01M 4/667* (2013.01); *H01M 4/664* (2013.01); *H01M 10/0525* (2013.01);
   (Continued)

(58) Field of Classification Search
   CPC .. H01M 4/667; H01M 50/136; H01M 50/105; H01M 10/0525; H01M 4/664
   See application file for complete search history.

(56) References Cited

U.S. PATENT DOCUMENTS

| 6,493,209 | B1 | 12/2002 | Kamath et al. |
| 2012/0009471 | A1 | 1/2012 | Sugiura et al. |
| 2017/0229733 | A1 | 8/2017 | Ohwada et al. |

FOREIGN PATENT DOCUMENTS

| JP | 2013-134865 A1 | 7/2013 |
| JP | 2013134865 A * | 7/2013 |

(Continued)

OTHER PUBLICATIONS

Extended European Search Report (Application No. 19774833.8) dated Nov. 30, 2021.

(Continued)

*Primary Examiner* — Olatunji A Godo
(74) *Attorney, Agent, or Firm* — BURR PATENT LAW, PLLC

(57) ABSTRACT

A positive electrode of a lithium secondary battery includes a sheet-like positive electrode current collector having conductivity, and a positive electrode active material plate that is a plate-like ceramic sintered compact joined to the positive electrode current collector via a conductive joint layer. The positive electrode active material plate includes at least one active material plate element. This at least one active material plate element is joined to the positive electrode current collector. A main surface of the active material plate element that opposes the positive electrode current collector includes a joint region in which the conductive joint layer exists between the positive electrode current collector and the active material plate element and a non-joint region in which the conductive joint layer does not exist between the positive electrode current collector and the active material plate element. The non joint region is arranged around the joint region.

8 Claims, 2 Drawing Sheets

(51) Int. Cl.
*H01M 10/0525* (2010.01)
*H01M 10/0585* (2010.01)
*H01M 50/105* (2021.01)
*H01M 4/02* (2006.01)
*H01M 50/119* (2021.01)
*H01M 50/121* (2021.01)
*H01M 50/124* (2021.01)

(52) U.S. Cl.
CPC ..... *H01M 10/0585* (2013.01); *H01M 50/105* (2021.01); *H01M 50/136* (2021.01); *H01M 2004/028* (2013.01); *H01M 50/119* (2021.01); *H01M 50/121* (2021.01); *H01M 50/124* (2021.01)

(56) References Cited

FOREIGN PATENT DOCUMENTS

| | | |
|---|---|---|
| JP | 5587052 B2 | 9/2014 |
| JP | 2016-207267 A1 | 12/2016 |
| KR | 10-2010-0082679 A | 7/2010 |
| WO | 2016/092888 A1 | 6/2016 |
| WO | 2017/065034 A1 | 4/2017 |
| WO | 2018/016166 A1 | 1/2018 |

OTHER PUBLICATIONS

English translation of the International Preliminary Report on Patentability (Chapter I)(Application No. PCT/JP2019/007649) dated Oct. 8, 2020.
International Search Report and Written Opinion (Application No. PCT/JP2019/007649) dated May 28, 2019.

\* cited by examiner

LITHIUM SECONDARY BATTERY

CROSS-REFERENCE TO RELATED APPLICATION

The present application is a continuation application of International Application No. PCT/JP2019/007649, filed on Feb. 27, 2019, which claims priority to Japanese Patent Application No. 2018-060047, filed on Mar. 27, 2018. The contents of these applications are incorporated herein by reference in their entirety.

TECHNICAL FIELD

The present invention relates to a thin lithium secondary battery.

BACKGROUND ART

As a positive electrode active material layer in a lithium secondary battery (also referred to as a "lithium-ion secondary battery"), a powder dispersion type positive electrode active material layer formed by molding a kneaded mixture of, for example, lithium complex oxide (i.e., lithium transition metal oxide) powder, a binder, and a conductive agent has conventionally been known. Meanwhile, Japanese Patent No. 5587052 (Document 1) proposes a technique for increasing the capacity of a positive electrode by using a lithium complex oxide sintered plate as a positive electrode active material layer joined to a positive electrode current collector.

Incidentally, a thin lithium secondary battery embedded in a smart card or any other device repeatedly receives bending loads during a bending test of the smart card or any other situation. In the case where a sintered plate is used as a positive electrode active material layer of the lithium secondary battery and if the sintered plate is broken when the lithium secondary battery bends during the bending test or any other situation, the battery surface may swell, or broken pieces of the sintered plate may overlap with one another, resulting in a reduction in the output of the lithium secondary battery.

SUMMARY OF INVENTION

The present invention is intended for a thin lithium secondary battery, and it is an object of the present invention to suppress breakage of an active material plate.

A lithium secondary battery according to a preferable embodiment of the present invention includes a positive electrode, a negative electrode, and an electrolyte existing between the positive electrode and the negative electrode. At least one of the positive electrode and the negative electrode includes a sheet-like current collector having conductivity, and an active material plate that is a plate-like ceramic sintered compact joined to the current collector via a conductive joint layer. The active material plate includes at least one active material plate element joined to the current collector. A main surface of each active material plate element that opposes the current collector includes a joint region in which the conductive joint layer exists between the current collector and the active material plate element, and a non joint region that is arranged around the joint region and in which the conductive joint layer does not exist between the current collector and the active material plate element. According to the present invention, it is possible to suppress breakage of the active material plate.

Preferably, the non-joint region surrounds an entire circumference of the joint region.

Preferably, the non-joint region has an area that is 64% or more and 570% or less of an area of the joint region.

Preferably, the active material plate includes a plurality of active material plate elements arranged on the current collector and each joined to the current collector, the plurality of active material plate elements being spaced from one another.

Preferably, the plurality of active material plate elements have the same shape.

Preferably, the conductive joint layer includes conductive powder, and a binder containing a polyimide-amide resin.

Preferably, a main surface of the current collector that opposes the active material plate is covered with a conductive carbon layer.

Preferably, the lithium secondary battery is used as a power supply source in a sheet-like device or a device having flexibility. More preferably, the lithium secondary battery is used as a power supply source in a smart card that is the device having flexibility.

A thin lithium secondary battery according to another preferable embodiment of the present invention includes a positive electrode, a negative electrode, and an electrolyte existing between the positive electrode and the negative electrode. At least one of the positive electrode and the negative electrode includes a sheet-like current collector having conductivity, and an active material plate that is a plate-like ceramic sintered compact joined to the current collector via a conductive joint layer. The active material plate includes a plurality of active material plate elements arranged on the current collector and each joined to the current collector.

These and other objects, features, aspects and advantages of the present invention will become more apparent from the following detailed description of the present invention when taken in conjunction with the accompanying drawings.

DESCRIPTION OF EMBODIMENTS

Figure 1:
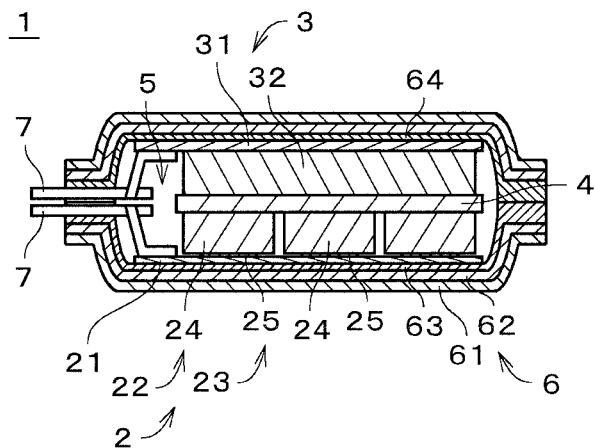
FIG. 1 is a cross-sectional view of a lithium secondary battery according to an embodiment.

FIG. 1 is a sectional view illustrating a configuration of a lithium secondary battery 1 according to an embodiment of the present invention. In order to facilitate the understanding of the drawing, the lithium secondary battery 1 and its components are illustrated thicker than normal in FIG. 1. FIG. 1 further illustrates the structures of some components present in front and back of the section.

The lithium secondary battery 1 is used as, for example, a power supply source in a sheet-like device or a device having flexibility. The sheet-like device as used herein refers to a thin device that is easy to deform by a relatively small force, and is also referred to as a film device. In the present embodiment, the lithium secondary battery 1 is used as, for example, a power supply source in a smart card having an arithmetic processing function. The smart card is a card-type device having flexibility.

The lithium secondary battery 1 is a small and thin battery. The lithium secondary battery 1 has, for example, a generally rectangular shape in plan view. For example, the lithium secondary battery 1 has a longitudinal length of 10 mm to 46 mm and a lateral length of 10 mm to 46 mm in plan view. The thickness of the lithium secondary battery 1 (i.e., the thickness in the up-down direction in FIG. 1) is, for example, in the range of 0.30 mm to 0.45 mm. The lithium secondary battery 1 is a sheet-like member or a thin plate-like member having flexibility. The sheet-like member as used herein refers to a thin member that is easy to deform by a relatively small force, and is also referred to as a film member. The same applies to the following description.

The lithium secondary battery 1 includes a positive electrode 2, a negative electrode 3, a separator 4, an electrolyte 5, an outer sheath 6, and two terminals 7. In the example illustrated in FIG. 1, the positive electrode 2, the separator 4, and the negative electrode 3 are laminated one above another in the up-down direction in the drawing. In the following description, the upper side and the lower side in FIG. 1 are simply referred to respectively as the "upper side" and the "lower side." The up-down direction in FIG. 1 is simply referred to as the "up-down direction" and also referred to as the "lamination direction." The up-down direction in FIG. 1 does not necessary have to correspond to the actual up-down direction when the lithium secondary battery 1 is embedded in a device such as a smart card.

In the example illustrated in FIG. 1, the separator 4 is laminated on the upper surface of the positive electrode 2 in the lamination direction. The negative electrode 3 is laminated on the upper surface of the separator 4 in the lamination direction. In other words, the negative electrode 3 is laminated on the side of the separator 4 opposite the positive electrode 2 in the lamination direction. For example, the positive electrode 2, the separator 4, and the negative electrode 3 each have a generally rectangular shape in plan view. The positive electrode 2, the separator 4, and the negative electrode 3 have approximately the same shape in plan view (i.e., approximately the same shape and approximately the same size).

The outer sheath 6 is a sheet-like member. The outer sheath 6 is formed of, for example, a laminated film in which metal foil 61 formed of a metal such as aluminum and a resin layer 62 having insulating properties are laminated one above the other. The outer sheath 6 is a bag-like member in which the resin layer 62 is located inside the metal foil 61.

The outer sheath 6 covers the positive electrode 2 and the negative electrode 3 from opposite sides in the lamination direction. The outer sheath 6 houses therein the positive electrode 2, the separator 4, the negative electrode 3, and the electrolyte 5. The electrolyte 5 exists continuously around the positive electrode 2, the separator 4, and the negative electrode 3. In other words, the electrolyte 5 exists between the positive electrode 2 and the negative electrode 3. The electrolyte 5 is a liquid electrolytic solution with which the positive electrode 2, the separator 4, and the negative electrode 3 are impregnated. In FIG. 1, the electrolyte 5 is not cross-hatched. The two terminals 7 protrude outward from the inside of the outer sheath 6. In the outer sheath 6, one of the terminal 7 is electrically connected to the positive electrode 2, and the other terminal 7 is electrically connected to the negative electrode 3.

The positive electrode 2 includes a positive electrode current collector 21, a positive electrode active material plate 22, and a conductive joint layer 23. The positive electrode current collector 21 is a sheet-like member having conductivity. The lower surface of the positive electrode current collector 21 is joined to the outer sheath 6 via a positive electrode joint layer 63. The positive electrode active material plate 22 is a relatively thin plate-like ceramic sintered compact that contains a lithium complex oxide. The positive electrode active material plate 22 is joined to the upper surface of the positive electrode current collector 21 via the conductive joint layer 23. The positive electrode active material plate 22 opposes the separator 4 in the up-down direction.

The positive electrode current collector 21 includes, for example, metal foil formed of a metal such as aluminum, and a conductive carbon layer laminated on the upper surface of the metal foil. In other words, the main surface of the positive electrode current collector 21 that opposes the positive electrode active material plate 22 is covered with the conductive carbon layer. The aforementioned metal foil may be formed of any of various metals other than aluminum (e.g., copper, nickel, silver, gold, chromium, iron, tin, lead, tungsten, molybdenum, titanium, zinc, or an alloy containing these metals). The aforementioned conductive carbon layer may be omitted from the positive electrode current collector 21. The positive electrode joint layer 63 is formed of, for example, a mixture of resins including an acid-denatured polyolefin resin and an epoxy resin. The positive electrode joint layer 63 may be formed of any of other various materials.

The positive electrode active material plate 22 has a structure in which a plurality of (i.e., a large number of) primary particles are coupled to one another. These primary particles are composed of a lithium complex oxide having a layered rock-salt structure. The lithium complex oxide is typically an oxide expressed by a general formula: $Li_pMO_2$, where $0.05<p<1.10$. M is at least one type of transition metal and contains, for example, one or more types selected from cobalt (Co), nickel (Ni), and manganese (Mn). The layered rock-salt structure as used herein refers to a crystal structure in which a lithium layer and a transition metal layer other than lithium are laminated alternately with an oxygen layer in between. That is, the layered rock-salt structure is a crystal structure in which a transition metal ion layer and a single lithium layer are laminated alternately with oxide ions in between (typically, an α-NaFeO$_2$-type structure, i.e., a structure in which a transition metal and lithium are arranged regularly in the (111) axial direction of a cubic rock-salt structure).

Preferable examples of the lithium complex oxide having a layered rock-salt structure include lithium cobalt oxides ($Li_pCoO_2$, where $1 \leq p \leq 1.1$), lithium nickel oxides ($LiNiO_2$), lithium manganese oxides ($Li_2MnO_3$), lithium nickel manganese oxides ($Li_p(Ni_{0.5}, Mn_{0.5})O_2$), solid solutions expressed by a general formula $Li_p(Co_x, Ni_x, Mn_z)O_2$, where $0.97 \leq p \leq 1.07$ and $x+y+z=1$, solid solutions expressed by $Li_p(Co_x, Ni_x, Al_z)O_2$, where $0.97 \leq p \leq 1.07$, $x+y+z=1$, $0 \leq x \leq 0.25$, $0.6 \leq y \leq 0.9$, and $0 \leq z \leq 0.1$, and solid solutions expressed by $Li_2MnO_3$ and $LiMO_2$, where M is a transition metal such as Co or Ni. Particularly preferably, the lithium complex oxide is a lithium cobalt oxide expressed by $Li_pCoO_2$, where $1 \leq p \leq 1.1$ and is, for example, $LiCoO_2$.

Note that the positive electrode active material plate 22 may further contains one or more types of elements including magnesium (Mg), Al, silicon (Si), calcium (Ca), titanium (Ti), vanadium (V), chromium (Cr), iron (Fe), copper (Cu), zinc (Zn), gallium (Ga), germanium (Ge), strontium (Sr), yttrium (Y), zirconia (Zr), niobium (Nb), molybdenum (Mo), silver (Ag), tin (Sn), antimony (Sb), tellurium (Te), barium (Ba), and bismuth (Bi). As another alternative, the positive electrode active material plate 22 may be subjected to sputtering of gold (Au) or other elements serving as a collector assistant.

In the positive electrode active material plate 22, a mean pore diameter of the aforementioned primary particles, i.e., a primary pore diameter, is, for example, less than or equal to 20 µm and preferably less or equal to 15 µm. The primary pore diameter is also, for example, greater than or equal to 0.2 µm and preferably greater than or equal to 0.4 µm. This primary pore diameter can be measured by analyzing a scanning electron microscope (SEM) image of a cross section of the positive electrode active material plate 22. Specifically, for example, the positive electrode active material plate 22 is processed using a cross-section polisher (CP) to expose a polished cross section, and this polished cross section is observed at a predetermined magnification (e.g., 1000 times) and in a predetermined field of view (e.g., 125 µm×125 µm), using an SEM. At this time, the field of view is set such that 20 or more primary particles are present in the field of view. In the obtained SEM image, the diameters of circumcircles drawn for all of the primary particles are obtained, and an average value of these diameters is assumed to be the primary pore diameter.

In the positive electrode active material plate 22, an average angle of inclination of the primary particles is greater than 0° and less than or equal to 30°. This average angle of inclination is preferably greater than or equal to 5° and less than or equal to 28°, more preferably greater than or equal to 10° and less than or equal to 25°. This average angle of inclination is an average value of angles formed by the (003) planes of the primary particles and a main surface of the positive electrode active material plate 22 (e.g., the lower surface of the positive electrode active material plate 22).

The angles of inclination of the primary particles (i.e., the angles formed by the (003) planes of the primary particles and a main surface of the positive electrode active material plate 22) can be measured by analyzing a cross section of the positive electrode active material plate 22 by electron backscatter diffraction (EBSD). Specifically, for example, the positive electrode active material plate 22 is processed using a cross-section polisher to expose a polished cross section, and this polished cross section is observed at a predetermined magnification (e.g., 1000 times) and in a predetermined field of view (e.g., 125 µm×125 µm) by EBSD. In the obtained EBSD image, the angle of inclination of each primary particle is expressed by light and shade of colors, and a darker color indicates a smaller angle of orientation. Then, an average value of the angles of inclination of the primary particles obtained from the EBSD image is assumed to be the aforementioned average angle of inclination.

Among the primary particles constituting the positive electrode active material plate 22, the proportion of primary particles whose angles of inclination are greater than or equal to 0° and less than or equal to 30° is preferably 60% or higher, more preferably 80% or higher, and yet more preferably 90% or higher. The upper limit of this proportion is not particularly limited, and may be 100%. In the aforementioned EBSD image, this proportion can be obtained by obtaining a total area of the primary particles whose angles of inclination are greater than or equal to 0° and less than or equal to 30° and dividing this total area of the primary particles by a total particle area.

The positive electrode active material plate 22 has a porosity of, for example, 25% to 45%. The "porosity" as used in the specification of the present invention refers to a volume ratio of pores (including open pores and closed pores) in the positive electrode active material plate 22. This porosity can be measured by analyzing a sectional scanning electron microscope (SEM) image of the positive electrode active material plate 22. For example, the positive electrode active material plate 22 is processed using a cross-section polisher (CP) to expose a polished cross section. This polished cross section is observed at a predetermined magnification (e.g., 1000 times) and in a predetermined field of view (e.g., 125 µm×125 µm), using an SEM. The obtained SEM image is subjected to image analysis, and the porosity (%) is obtained by dividing the total area of the pores in the field of view by the area (cross-sectional area) of the positive electrode active material plate 22 in the field of view and multiplying the obtained value by 100.

An average value of the diameters of the pores in the positive electrode active material plate 22, i.e., a mean pore diameter, is, for example, less than or equal to 15 µm, preferably less than or equal to 12 µm, and more preferably less than or equal to 10 µm. This mean pore diameter is also, for example, greater than or equal to 0.1 µm and preferably greater than or equal to 0.3 µm. In the case where the pores are assumed to be spheres having the same volume or the same cross-sectional area, the aforementioned diameters of the pores are typically the diameters of these spheres. The mean pore diameter is a value calculated by multiplying an average value of the diameters of a plurality of pores by the number of pores. This mean pore diameter can be obtained by, for example, cross-sectional SEM image analysis or a known method such as mercury intrusion porosimetry. Preferably, this mean pore diameter is measured by mercury intrusion porosimetry using a mercury porosimeter.

The conductive joint layer 23 includes conductive powder and a binder. Examples of the conductive powder include acetylene black, scaly natural graphite, carbon nanotubes, carbon nanofibers, carbon nanotube derivatives, and carbon nanofiber derivatives. The binder contains, for example, polyimide-amide resins. The polyimide-amide resins contained in the binder may be of one type, or may be a combination of two or more types. This binder may contain resins other than polyimide-amide resins. For example, acrylic ester may be used as the binder. The conductive joint layer 23 is formed by applying the conductive powder and the binder described above as well as a liquid or paste adhesive containing a solvent to the positive electrode current collector 21 or the positive electrode active material plate 22 and causing the solvent to evaporate and solidify between the positive electrode current collector 21 and the positive electrode active material plate 22.

Preferably, the conductive joint layer 23 contains substantially no substances other than the conductive powder and the binder. In other words, the total proportion of the conductive powder and the binder in the conductive joint layer 23 is substantially 100% by weight. The weight of the conductive powder in the conductive joint layer 23 is, for example, 50% to 1000% by weight of the binder, preferably 100% to 750%, and more preferably 250% to 750%. The volume proportion of the conductive powder in the conductive joint layer 23 is, for example, 50% to 90%.

Figure 2:
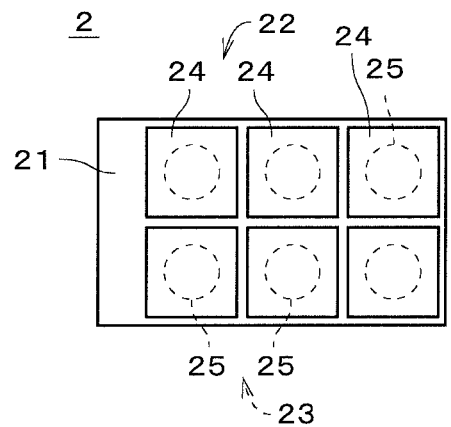
FIG. 2 is a plan view of a positive electrode.

FIG. 2 is a plan view illustrating the positive electrode 2. The positive electrode active material plate 22 includes a plurality of active material plate elements 24. The active material plate elements 24 are arranged in a matrix (i.e., in grid form) on the positive electrode current collector 21. Each active material plate element 24 has, for example, a generally rectangular shape in plan view. The active material plate elements 24 have approximately the same shape in plan view (i.e., approximately the same shape and approximately the same size). The active material plate elements 24 are spaced from one another in plan view.

In the example illustrated in FIG. 2, six active material plate elements 24 having a generally square shape in plan view are arranged in a 2 by 3 matrix of elements. One side of each active material plate element 24 has a length of, for example, 5 mm to 40 mm in plan view. Note that the number of active material plate elements 24 and the arrangement thereof may be modified in various ways. The shape of each active material plate element 24 may also be modified in various ways. For example, the positive electrode active material plate 22 may be configured of a single active material plate element 24 having a generally rectangular shape in plan view. In other words, the positive electrode active material plate 22 may include at least one active material plate element 24 joined to the positive electrode current collector 21.

The conductive joint layer 23 includes a plurality of joint layer elements 25 that correspond to the plurality of active material plate elements 24. In FIG. 2, the outline (i.e., outer edge) of each joint layer element 25 in the conductive joint layer 23 is indicated by a broken line. The number of joint layer elements 25 is, for example, the same as the number of active material plate elements 24. The joint layer elements 25 are arranged between the positive electrode current collector 21 and the active material plate elements 24, respectively, in the up-down direction. In the positive electrode 2, the active material plate elements 24 are joined respectively by the joint layer elements 25 to the positive electrode current collector 21. Alternatively, in the positive electrode 2, a single active material plate element 24 may be joined by two or more joint layer elements 25 to the positive electrode current collector 21.

Each joint layer element 25 has, for example, a generally circular shape in plan view. In plan view, each joint layer element 25 is smaller than an active material plate element 24, and each joint layer element 25 as a whole is covered with an active material plate element 24. In other words, the entire outer edge of each joint layer element 25 is located inside the outer edge of an active material plate element 24. In yet other words, each joint layer element 25 does not extend off the edge of an active material plate element 24. The shape of the joint layer elements 25 in plan view is not limited to a generally circular shape, and may be modified into any other shape such as a generally oblong shape or a generally oval shape.

The thickness of the positive electrode current collector 21 is, for example, in the range of 9 μm to 50 μm, preferably in the range of 9 μm to 20 μm, and more preferably in the range of 9 μm to 15 μm. The thickness of the positive electrode active material plate 22 (i.e., the thickness of each active material plate element 24) is, for example, in the range of 15 μm to 200 μm, preferably in the range of 30 μm to 150 μm, and more preferably in the range of 50 μm to 100 μm. The thickness of the conductive joint layer 23 (i.e., the thickness of each joint layer element 25) is, for example, in the range of 3 μm to 28 μm and preferably in the range of 5 μm to 25 μm.

Figure 3:
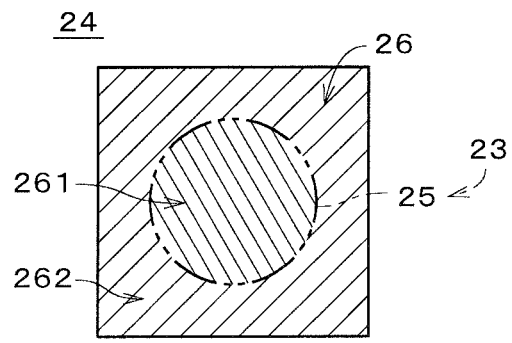
FIG. 3 is a bottom view of an active material plate element.

FIG. 3 is a bottom view illustrating the main surface of one active material plate element 24 that opposes the positive electrode current collector 21. This main surface corresponds to the lower surface in FIG. 1 and referred to as a "joint face 26" in the following description. In the example illustrated in FIG. 3, the joint face 26 has a generally square shape. The other five active material plate elements 24 also have the same joint faces 26 as that illustrated in FIG. 3. In FIG. 3, the outer edge of the joint layer element 25 of the conductive joint layer 23 that is located between the joint face 26 of the active material plate element 24 and the positive electrode current collector 21 is also illustrated using a chain double-dashed line.

The joint face 26 of the active material plate element 24 includes a joint region 261 and a non-joint region 262. In order to facilitate the understanding of the drawing, the joint regions 261 and the non-joint region 262 are cross-hatched in FIG. 3. The joint region 261 is a region in which the joint layer element 25 of the conductive joint layer 23 exists between the active material plate element 24 and the positive electrode current collector 21. Therefore, in the joint region 261, the active material plate element 24 and the positive electrode current collector 21 are joined together by the joint layer element 25. The non-joint region 262 is a region arranged around the joint region 261. In the non-joint region 262, the conductive joint layer 23 does not exist between the active material plate element 24 and the positive electrode current collector 21. Therefore, in the non-joint region 262, the active material plate element 24 and the positive electrode current collector 21 are not joined.

The joint region 261 is located in the central portion of the joint face 26. In the example illustrated in FIG. 3, the joint region 261 is a generally circular region. Preferably, the non-joint region 262 surrounds the entire circumference of the joint region 261. In each joint face 26, the area of the non-joint region 262 is, for example, 64% to 570% of the area of the joint region 261, preferably 64% to 400%, and more preferably 64% to 200%. In other words, the area of the joint region 261 is, for example, 15% to 61% of the total area of the joint region 261 and the non-joint region 262 (i.e., the total area of the joint face 26), preferably 20% to 61%, and more preferably 30% to 61%.

The negative electrode 3 includes a negative electrode current collector 31 and a negative electrode active material layer 32. The negative electrode current collector 31 is a sheet-like member having conductivity. The upper surface of the negative electrode current collector 31 is joined to the outer sheath 6 via a negative electrode joint layer 64. The negative electrode active material layer 32 includes a carbonaceous material or a lithium occlusion substance. The negative electrode active material layer 32 coats the lower surface of the negative electrode current collector 31. The negative electrode active material layer 32 opposes the separator 4 in the up-down direction.

The negative electrode current collector 31 is, for example, metal foil formed of a metal such as copper. The metal foil may be formed of any of various metals other than copper (e.g., stainless steel, nickel, aluminum, titanium, zinc, or an alloy containing any of these metals). The negative electrode joint layer 64 is formed of, for example, a mixture of resins including an acid-denatured polyolefin resin and an epoxy resin. The negative electrode joint layer 64 may be formed of any of other various materials. In the negative electrode active material layer 32, the carbonaceous material is, for example, natural graphite, artificial graphite, amorphous carbon that is hard to graphitize, or carbon that is easy to graphitize, and the lithium occlusion substance is, for example, silicon, aluminum, tin, iron, iridium, or an alloy or oxide or fluoride that contains any of these substances.

The thickness of the negative electrode current collector 31 is, for example, in the range of 5 μm to 25 μm, preferably in the range of 8 μm to 20 μm, and more preferably in the range of 8 μm to 15 μm. The thickness of the negative electrode active material layer 32 is, for example in the range of 20 μm to 300 μm, preferably in the range of 30 μm to 250 μm, and more preferably in the range of 30 μm to 150 μm.

As described above, the lithium secondary battery 1 includes the positive electrode 2, the negative electrode 3, and the electrolyte 5. The electrolyte 5 exists between the positive electrode 2 and the negative electrode 3. The positive electrode 2 includes the sheet-like positive electrode current collector 21 having conductivity, and the positive electrode active material plate 22 that is a plate-like ceramic sintered compact joined to the positive electrode current collector 21 via the conductive joint layer 23. The positive electrode active material plate 22 includes a plurality of active material plate elements 24 arranged on the positive electrode current collector 21. Each of the active material plate elements 24 is joined to the positive electrode current collector 21. The main surface (i.e., joint face 26) of each active material plate element 24 that opposes the positive electrode current collector 21 includes the joint region 261 in which the conductive joint layer 23 exists between the positive electrode current collector 21 and the active material plate element 24, and the non-joint region 262 in which the conductive joint layer 23 does not exist between the positive electrode current collector 21 and the active material plate element 24. The non-joint region 262 is arranged around the joint region 261.

In the lithium secondary battery 1, it is possible to reduce a situation where the non-joint region 262 of each active material plate element 24 becomes deformed following deformation of the positive electrode current collector 21 in cases such as where the lithium secondary battery 1 bends in the up-down direction. The non-joint region 262 of each active material plate element 24 may be spaced slightly from the positive electrode current collector 21 in the up-down direction when the lithium secondary battery 1 becomes deformed. This suppresses deformation and breakage of each active material plate element 24 when the lithium secondary battery 1 becomes deformed. As a result, it is possible to suppress a reduction in the output of the lithium secondary battery 1 due to breakage of the positive electrode active material plate 22. It is also possible to suppress the occurrence of wrinkles in the outer sheath 6 due to breakage of the positive electrode active material plate 22.

As described above, the positive electrode active material plate 22 does not necessarily have to include a plurality of active material plate elements 24, and may include at least one active material plate element 24. Even in this case, the main surface (i.e., joint face 26) of this at least one active material plate element 24 that opposes the positive electrode current collector 21 includes the joint region 261 in which the conductive joint layer 23 exists between the positive electrode current collector 21 and the active material plate element 24, and the non-joint region 262 in which the conductive joint layer 23 does not exist between the positive electrode current collector 21 and the active material plate element 24. The non-joint region 262 is arranged around the joint region 261. Accordingly, as described above, it is possible to suppress deformation and breakage of this at least one active material plate element 24 when the lithium secondary battery 1 becomes deformed.

In the lithium secondary battery 1, as described above, it is possible to suppress breakage of the positive electrode active material plate 22 when the lithium secondary battery 1 becomes deformed. Therefore, the lithium secondary battery 1 is particularly suitable for use as a power supply source in a device that is relatively easy to deform and that is likely to receive bending loads, i.e., a sheet-like device or a device having flexibility. In the case where the lithium secondary battery 1 is used as a power supply source in a smart card, which is one of the devices having flexibility, it is possible to suitably achieve both a reduction in the thickness of the smart card and suppression of breakage of the positive electrode active material plate 22.

Tables 1 and 2 show the relationships of the proportions of the areas of the joint regions 261 and the non-joint regions 262, extension of the conductive joint layer 23, breakage of the active material plate elements 24, and battery characteristics of the lithium secondary battery 1. Table 1 shows the proportion of the area of the non-joint regions 262 to the area of the joint regions 261 (i.e., A2/A1) and the proportion of the area of the joint regions 261 to the total area of the joint faces 26 (i.e., A1/(A1+A2)), where A1 indicates the area of the joint regions 261 and A2 indicates the area of the non-joint regions 262.

TABLE 1

| | Non-Joint Region/Joint region A2/A1 | Joint Area Ratio A1/(A1 + A2) | Extension of Adhesive |
|---|---|---|---|
| Example 1 | 1.94 | 34% | None |
| Example 2 | 5.67 | 15% | None |
| Example 3 | 0.64 | 61% | None |
| Example 4 | 9.00 | 10% | None |
| Example 5 | 0.54 | 65% | Slight Extension |

TABLE 2

| | Peel Test | | Battery Characteristics 1 C/0.5 C (%) |
|---|---|---|---|
| | Peel Strength (N) | Cracks | |
| Example 1 | 0.33 | None | 85.3 |
| Example 2 | 0.27 | None | 83.2 |
| Example 3 | 0.40 | None | 85.1 |
| Example 4 | 0.07 | Cracks at Edge | 72.5 |
| Example 5 | 0.42 | None | 85.2 |

In Examples 1 to 4, the conductive joint layer 23 did not extend off the edges of the active material plate elements 24 when the active material plate elements 24 were joined to the positive electrode current collector 21. In Example 5, when the active material plate elements 24 were joined to the positive electrode current collector 21, the conductive joint layer 23 was pressed and extruded so as to extend slightly off the edges of the active material plate elements 24. In Example 5, these extended active material plate elements 24 exerted no influence on electrical characteristics or other features of the lithium secondary battery 1.

In Examples 1 to 3 and 5, no cracks occurred in the active material plate elements 24 during a peel test. Peel strength measured in the peel test was higher than or equal to 0.25N, so that the active material plate elements 24 and the positive electrode current collector 21 were mechanically suitably joined together. Moreover, 1 C/0.5 C indicating battery characteristics was greater than or equal to 75%, so that the active material plate elements 24 and the positive electrode current collector 21 were also electrically suitably connected to each other. In Example 4, cracks occurred in the active material plate elements 24 during the peel test, but these cracks occurred at the ends of the active material plate elements 24, and therefore a reduction in battery characteristics was relatively small.

The aforementioned peel test was conducted in accordance with the following procedure, using a peel tester. As the peel tester, a force gauge "ZTA-20N" and a vertical monitored test stand "MX2-500N" manufactured by IMADA Co., Ltd were used.

In this peel test, a test specimen was first created by joining the active material plate elements 24 to a current collector test specimen corresponding to the positive electrode current collector 21 via the conductive joint layer 23. The active material plate elements 24 were 10-mm square plates in plan view. The current collector test specimen was aluminum foil having a thickness of 9 μm and produced by Fukuda metal foil & powder Co., ltd. The test specimen had a 10 mm by 30 mm rectangular shape in plan view. The conductive joint layer 23 was applied in generally circular form onto central portions of the joint faces 26 of the active material plate elements 24. The active material plate elements 24 were joined to one end of the current collector test specimen in the longitudinal direction via the conductive joint layer 23. Then, the surroundings of the active material plate elements 24 were observed to confirm whether the conductive joint layer 23 extended off the edges of the active material plate elements 24.

Then, the test specimen was fixed onto a metal plate, and this metal plate was placed in the peel tester. This fixation of the test specimen to the metal plate was made by joining the main surfaces of the active material plate elements 24 of the test specimen (i.e., the main surfaces on the side opposite the current collector test specimen) to the metal plate with a carbon tape or other means. Next, the other end of the current collector test specimen in the longitudinal direction (i.e., the end on the side opposite the end joined to the active material plate elements 24) was pulled in a direction perpendicular to the metal plate by the peel tester. Then, a maximum value of tensile strength acting when peeling the current collector test specimen off the active material plate elements 24 was acquired as the "peel strength."

Moreover, the active material plate elements 24 after the peeling of the current collector test specimen were observed to confirm the presence or absence of breakage of the active material plate elements 24. Furthermore, an image of the joint faces 26 of the active material plate elements 24 was captured to obtain the area of the conductive joint layer 23 in the acquired image (i.e., the areas of the joint regions 261). Specifically, these areas were obtained by calculating the number of black pixels corresponding to the conductive joint layer 23 in the aforementioned image, using "Adobe Photoshop (registered trademark)" from Adobe Systems Incorporated. In the case where the active material plate elements 24 were broken during the peel test, the area of the conductive joint layer 23 in each broken piece of the active material plate elements 24 was obtained by a similar method, and these areas were totaled.

As described above, in the lithium secondary battery 1, the non-joint regions 262 surround the entire circumferences of the joint regions 261. This readily prevents the conductive joint layer 23 existing in the joint regions 261 from spreading between the active material plate elements 24 and the positive electrode current collector 21 and extending off the edges of the active material plate elements 24.

As can be seen from Examples 1 to 3 described above, in the lithium secondary battery 1, it is preferable that the area of the non-joint regions 262 is 64% or more and 570% or less of the area of the joint regions 261. In this case, the lithium secondary battery 1 can suitably achieve both an increase in conduction between the positive electrode active material plate 22 and the positive electrode current collector 21 and suppression of breakage of the positive electrode active material plate 22. Specifically, it is possible, by setting the area of the non-joint regions 262 to 64% or more of the area of the joint regions 261, to prevent the conductive joint layer 23 from extending off the edges of the active material plate elements 24, for example when the active material plate elements 24 are joined to the positive electrode current collector 21. Meanwhile, it is possible, by setting the area of the non-joint regions 262 to 570% or less of the area of the joint regions 261, to suitably suppress breakage of the active material plate elements 24 when the lithium secondary battery 1 becomes deformed. Besides, electrical connection between the active material plate elements 24 and the positive electrode current collector 21 can be suitably achieved.

As described above, the active material plate elements 24 are spaced from one another. Accordingly, even if the active material plate elements 24 are broken when the lithium secondary battery 1 becomes deformed, it is possible to prevent or suppress overlapping of the active material plate elements 24 in the up-down direction. As a result, the occurrence of wrinkles in the outer sheath 6 due to breakage of the positive electrode active material plate 22 can be further suppressed.

In the lithium secondary battery 1, the active material plate elements 24 have the same shape. By in this way uniformly dividing and arranging the positive electrode active material plate 22, it is possible to equalize the stress occurring in the active material plate elements 24 when the lithium secondary battery 1 becomes deformed and to further suppress breakage of the positive electrode active material plate 22.

As described above, the conductive joint layer 23 includes the conductive powder and the binder containing a polyimide-amide resin. This suppress gelation of the conductive joint layer 23 due to, for example, reactions occurring with the electrolyte 5 under high temperatures. As a result, a reduction in joint strength between the positive electrode active material plate 22 and the positive electrode current collector 21 can be suppressed.

In the lithium secondary battery 1, the main surface of the positive electrode current collector 21 that opposes the positive electrode active material plate 22 is covered with the conductive carbon layer. This increases conduction between the positive electrode current collector 21 and the positive electrode active material plate 22. As a result, it is possible to increase the output of the lithium secondary battery 1.

Figure 4:
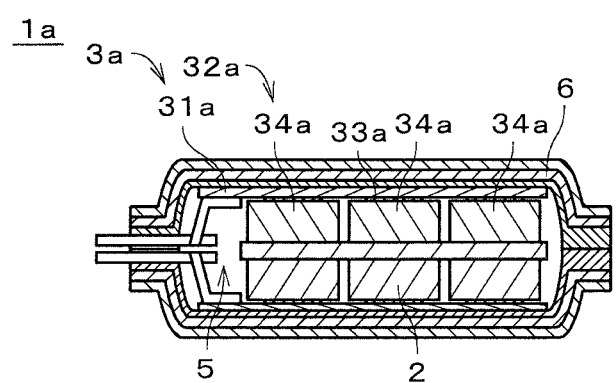
FIG. 4 is a cross-sectional view of another lithium secondary battery.

FIG. 4 is a cross-sectional view illustrating a configuration of another preferable lithium secondary battery 1a. The lithium secondary battery 1a has approximately the same structure as the lithium secondary battery 1, except that a negative electrode 3a differs in structure from the negative electrode 3 illustrated in FIG. 1. In the following description, components of the lithium secondary battery 1a that correspond to those of the lithium secondary battery 1 are given the same reference signs.

The negative electrode 3a of the lithium secondary battery 1a has approximately the same structure as the positive electrode 2 illustrated in FIG. 1. Specifically, the negative electrode 3a includes a sheet-like negative electrode current collector 31a having conductivity, and a negative electrode active material plate 32a that is a plate-like ceramic sintered compact containing a lithium complex oxide (e.g., lithium titanium oxide (LTO)). The negative electrode active material plate 32a is joined to the negative electrode current collector 31a via a conductive joint layer 33a.

The negative electrode active material plate 32a includes a plurality of active material plate elements 34a arranged on the negative electrode current collector 31a. Each of the active material plate elements 34a is joined to the negative electrode current collector 31a. The joint form between the active material plate elements 34a and the negative electrode current collector 31a in the negative electrode 3a is the same as the joint form between the active material plate elements 24 and the positive electrode current collector 21 in the aforementioned positive electrode 2.

The thickness of the negative electrode active material plate 32a (i.e., the thickness of each active material plate element 34a) is, for example, in the range of 10 μm to 300 μm, preferably in the range of 30 μm to 200 μm, and more preferably in the range of 30 μm to 150 μm. The thickness of the conductive joint layer 33a is, for example, in the range of 3 μm to 30 μm and preferably in the range of 5 μm to 25 μm.

In the case where the negative electrode active material plate 32a of the lithium secondary battery 1a is divided into a plurality of active material plate elements 34a, the positive electrode active material plate 22 does not necessarily have to be divided into a plurality of active material plate elements 24, and may be a single plate-like ceramic sintered compact.

That is, in the lithium secondary battery 1a, at least one of the positive electrode 2 and the negative electrode 3a includes a sheet-like current collector having conductivity (i.e., the positive electrode current collector 21 or the negative electrode current collector 31a) and an active material plate (i.e., the positive electrode active material plate 22 or the negative electrode active material plate 32a) that is a plate-like ceramic sintered compact joined to the current collector via a conductive joint layer (i.e., the conductive joint layer 23 or the conductive joint layer 33a). This active material plate includes a plurality of active material plate elements (i.e., the active material plate elements 24 or the active material plate elements 34a) arranged on the current collector and each joined to the current collector. The main surface of each active material plate element that opposes the current collector includes a joint region in which the conductive joint layer exists between the current collector and the active material plate element, and a non-joint region that is arranged around the joint region and in which the conductive joint layer does not exist between the current collector and the active material plate element.

Therefore, as described above, it is possible to suppress deformation and breakage of each active material plate element when the lithium secondary battery 1a becomes deformed. As a result, a reduction in the output of the lithium secondary battery 1a due to breakage of the active material plate can be suppressed. Besides, the occurrence of wrinkles in the outer sheath 6 due to breakage of the active material plate can be suppressed. Accordingly, the lithium secondary battery 1a is particularly suitable for use as a power supply source in a sheet-like device or a device having flexibility. In the case where the lithium secondary battery 1a is used as a power supply source in a smart card, which is one of the devices having flexibility, it is possible to suitably achieve both a reduction in the thickness of the smart card and suppression of breakage of the active material plate.

In the lithium secondary battery 1a, the aforementioned non-joint regions surround the entire circumferences of the joint regions. Accordingly, it is possible to prevent the conductive joint layer existing in the joint regions from extending off the edges of the active material plate elements and adhering to the other members. The area of the non-joint regions is 64% or more and 570% or less of the area of the joint regions. Accordingly, it is possible to suitably achieve both an increase in conduction between the active material plate and the current collector and suppression of breakage of the active material plate.

In the lithium secondary battery 1a, the aforementioned active material plate elements are spaced from one another. This prevents or reduces a situation in which the active material plate elements are broken and overlap in the up-down when the lithium secondary battery 1a becomes deformed. As a result, it is possible to further suppress the occurrence of wrinkles in the outer sheath 6 due to breakage of the active material plate.

In the lithium secondary battery 1a, the active material plate elements have the same shape. By in this way uniformly dividing and arranging the active material plate, it is possible to further suppress breakage of the active material plate.

In the lithium secondary battery 1a, the conductive joint layer includes conductive powder and a binder containing a polyimide-amide resin. This suppresses gelation of the conductive joint layer due to, for example, reactions occurring with the electrolyte 5 under high temperatures. As a result, it is possible to suppress a reduction in joint strength between the active material plate and the current collector.

In the lithium secondary battery 1a, the main surface of the current collector that opposes the active material plate is covered with the conductive carbon layer. This increases conduction between the current collector and the active material plate. As a result, it is possible to increase the output of the lithium secondary battery 1a.

The aforementioned lithium secondary batteries 1 and 1a may be modified in various ways.

For example, in the positive electrode active material plate 22, the non-joint region 262 of each active material plate element 24 does not necessarily have to surround the entire circumference of the joint region 261, and may be arranged around the joint region 261. The area of the non-joint region 262 of each active material plate element 24 may be less than 64% of the area of the joint region 261, and may be larger than 570%. The same applies to each active material plate element 34a of the negative electrode active material plate 32a.

In the case where the lithium secondary battery 1 illustrated in FIG. 1 is used as a power supply source in a smart card, the joint face 26 of each active material plate element 24 does not necessarily have to include the joint region 261 and the non-joint region 262, and for example the active material plate element 24 may be joined by a conductive joint layer 23 that exists on the entire surface of the joint face 26 to the positive electrode current collector 21. Even in this case, breakage of the positive electrode active material plate 22 can be suppressed as a result of the positive electrode active material plate 22, which is joined to the positive electrode current collector 21 via the conductive joint layer 23, including a plurality of active material plate elements 24 arranged on the positive electrode current collector 21 and each joined to the positive electrode current collector 21.

Similarly, in the case where the lithium secondary battery 1a illustrated in FIG. 4 is used as a power supply source in a smart card, the entire main surfaces of the aforementioned active material plate elements (i.e., the active material plate elements 24 of the positive electrode active material plate 22 and the active material plate elements 34a of the negative electrode active material plate 32a) that oppose the current collector may serve as joint regions. In this case as well, breakage of the active material plate can be suppressed as a result of the active material plate, which is joined to the current collector via the conductive joint layer, including a plurality of active material plate elements arranged on the current collector and each joined to the current collector.

In the positive electrode active material plate 22, the active material plate elements 24 do not necessarily have to be spaced from one another. For example, the outer edges of the adjacent active material plate elements 24 may be in contact with one another. The same applies to the active material plate elements 34a of the negative electrode active material plate 32a.

In the positive electrode active material plate 22, the active material plate elements 24 do not necessarily have to have the same shape. For example, some of the active material plate elements 24 may have a different shape from that of the other active material plate elements 24. Alternatively, all of the active material plate elements 24 may have different shapes. The same applies to the active material plate elements 34a of the negative electrode active material plate 32a.

The components of the conductive joint layers 23 and 33a may be modified in various ways. For example, the binder of the conductive joint layer 23 or 33a does not necessarily have to contain a polyimide-amide resin.

The lithium secondary batteries 1 and 1a may be used as power supply sources in devices having flexibility (e.g., card-type devices) other than smart cards or in sheet-like devices (e.g., wearable devices mounted on clothing or body-attached devices). The lithium secondary batteries 1 and 1a may also be used as power supply sources in various objects (e.g., an IoT module) other than the aforementioned devices.

While the invention has been shown and described in detail, the foregoing description is in all aspects illustrative and not restrictive. It is therefore to be understood that numerous modifications and variations can be devised without departing from the scope of the invention.

The configurations of the above-described preferred embodiments and variations may be appropriately combined as long as there are no mutual inconsistencies.

INDUSTRIAL APPLICABILITY

The lithium secondary batteries according to the present invention are applicable as, for example, power supply sources in smart cards having an arithmetic processing function in various fields using lithium secondary batteries.

REFERENCE SIGNS LIST 1, 1a Lithium secondary battery
2 Positive electrode
3, 3a Negative electrode
5 Electrolyte
21 Positive electrode current collector
22 Positive electrode active material plate
23, 33a Conductive joint layer
24, 34a Active material plate element
26 Joint face
31, 31a Negative electrode current collector
32a Negative electrode active material plate
261 Joint region
262 Non-joint region

The invention claimed is:

1. A thin lithium secondary battery comprising:
a positive electrode;
a negative electrode; and
an electrolyte existing between said positive electrode and said negative electrode,
wherein at least one of said positive electrode and said negative electrode includes:
a sheet-like current collector having conductivity; and
an active material plate that is a plate-like ceramic sintered compact joined to said current collector via a conductive joint layer,
said active material plate includes at least one active material plate element joined to said current collector, and
a main surface of each active material plate element that opposes said current collector includes:
a joint region in which said conductive joint layer exists directly in contact with a portion between said current collector and the active material plate element; and
a non-joint region that is arranged around said joint region and in which said conductive joint layer does not exist directly in contact with a portion between said current collector and the active material plate element, and
wherein said non-joint region has an area that is 64% or more and 570% or less of an area of said joint region.

2. The lithium secondary battery according to claim 1, wherein said non-joint region surrounds an entire circumference of said joint region.

3. The lithium secondary battery according to claim 1, wherein
said active material plate includes a plurality of active material plate elements arranged on said current collector and each joined to said current collector, said plurality of active material plate elements being spaced from one another.

4. The lithium secondary battery according to claim 3, wherein
said plurality of active material plate elements have the same shape.

5. The lithium secondary battery according to claim 1, wherein
said conductive joint layer includes:
conductive powder; and
a binder containing a polyimide-amide resin.

6. The lithium secondary battery according to claim 1, wherein
a main surface of said current collector that opposes said active material plate is covered with a conductive carbon layer.

7. The lithium secondary battery according to claim 1, being used as a power supply source in a sheet-like device or a device having flexibility.

8. The lithium secondary battery according to claim 7, being used as a power supply source in a smart card that is said device having flexibility.

* * * * *